(12) United States Patent  
Lacaze

(10) Patent No.: US 7,119,472 B2
(45) Date of Patent: Oct. 10, 2006

(54) METHOD AND DEVICE FOR COMPENSATING THE ARMATURE REACTION OF A ROTATING EXCITER

(75) Inventor: Alain Lacaze, Essert (FR)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/768,125

(22) Filed: Feb. 2, 2004

(65) Prior Publication Data

US 2004/0189131 A1 Sep. 30, 2004

(30) Foreign Application Priority Data

Feb. 1, 2003 (DE) ................................ 103 04 022

(51) Int. Cl.
*H02K 1/10* (2006.01)

(52) U.S. Cl. ...................................... 310/183; 310/184

(58) Field of Classification Search ............. 310/68 R, 310/113–114, 123, 219, 216, 261, 254, 51, 310/179–185

See application file for complete search history.

(56) References Cited

U.S. PATENT DOCUMENTS

| 2,864,017 | A | * | 12/1958 | Waltscheff | ................... | 310/126 |
| 2,949,553 | A | * | 8/1960 | Benoit | ........................ | 310/162 |
| 3,109,978 | A | | 11/1963 | Baumann | | |
| 3,335,348 | A | | 8/1967 | Gossel | | |
| 3,369,139 | A | * | 2/1968 | Neumann | ............... | 310/102 R |
| 3,541,370 | A | | 11/1970 | Masahiro | | |
| 3,885,302 | A | | 5/1975 | Boesel | | |
| 4,034,245 | A | * | 7/1977 | Mailfert et al. | ............... | 310/52 |
| 6,844,639 | B1 | * | 1/2005 | Lacaze | .................... | 310/68 R |

FOREIGN PATENT DOCUMENTS

| DE | 240 470 A1 | 10/1986 |
| EP | 0 266 003 A2 | 5/1988 |
| FR | 608 509 A | 7/1926 |
| FR | 1169097 A | 12/1958 |
| GB | 982118 | 2/1965 |
| WO | 91/10278 | 7/1991 |

OTHER PUBLICATIONS

Search Report from DE 103 04 022.6 (Jan. 14, 2004).
Search Report from EP 04 10 0226 (Sep. 28, 2004).

* cited by examiner

*Primary Examiner*—Thanh Lam
(74) *Attorney, Agent, or Firm*—Adam J. Cermak; Cermak & Kenealy, LLP

(57) ABSTRACT

A very simple and reliable process for cancelling the reaction field (10) induced by a rotor (4) is proposed, wherein the rotor (4) is rotating in a static magnetic field (7) in a static outer core (3), and wherein the rotor (4) comprises at least two conductors (6) aligned substantially parallel to the axis (8) of the rotor (4). The armature reaction (10) is cancelled by means of a set of auxiliary windings (11) located on the static outer core (3) wherein said auxiliary windings (11) are fed with a direct current (DC) cancelling the reaction field (10). Preferentially, the process is applied to a brushless exciter and the auxiliary windings (11) have the same geometry as the conductors (6) of the rotor (4) and are all equally fed with a direct current corresponding to the current induced in the conductors (6) of the rotor (4) when the rotor is rotating in the static magnetic field (7).

29 Claims, 4 Drawing Sheets

METHOD AND DEVICE FOR COMPENSATING THE ARMATURE REACTION OF A ROTATING EXCITER

FIELD OF THE INVENTION

The present invention relates to a process for cancelling the reaction field, also called armature reaction, induced by a rotor which is rotating in a static magnetic field in a static outer core, wherein the rotor comprises at least two conductors aligned substantially parallel to the axis of the rotor. The present invention also relates to a static outer core for carrying out such a process and to a brushless exciter comprising such a static outer core.

BACKGROUND OF THE INVENTION

A synchronous machine is a dynamoelectric machine which may be utilised as a motor for driving a shaft or any load at a constant speed or as a generator for producing a voltage at a predetermined frequency depending on the speed of the driving shaft. When the device is used as a synchronous generator, it is customary to e.g. provide field excitation for the rotor through a synchronous brushless exciter generator. The exciter generator converts the direct current (DC) stator field into a polyphase alternating current (AC) armature voltage which is rectified by a set of rotating rectifiers mounted on or within the driving shaft to provide the DC excitation for the field windings of the synchronous generator, i.e. for the rotor of the generator.

Thus, a rotating exciter is a reversed generator with the field winding, fed with DC current, implemented on the static parts. The armature is located on the rotating part and produces AC voltage. A set of diodes is used to rectify it to produce a DC current, required to energise the field winding of the synchronous machine, i.e. the rotor of the generator.

As an order of magnitude, the power generated by the exciter is 0.5 to 2% of the rated power of the synchronous machine. Because the rotating exciter is a generator, this power could as well be made available with low, medium or high voltage. The voltage/current balance is chosen to best fit the available diodes characteristics. In principle the limitation in output current, due to the available diodes, can be overcome by setting two or more diodes in parallel. Actually this would result in a strong overload on diodes, and therefore the need for a heavy down-rating of them.

Nowadays, usually rotors operate at speeds of 3000 rotations per minute, leading to currents in the range of 2000 Ampere for energising the field winding of the synchronous machine. Usually the synchronous machine cannot be operated at higher rotational speeds due to a number of limitations such as instability of the shaft as well as high centrifugal forces on the rotating parts. In power generation, at a specified output, an increase of the rotary speed of a turbine however is associated with a decrease in size and costs. Efficiency, too, can be improved. Already, power generation turbines up to 70 MW are therefore connected to generators by way of gearing arrangements, so as to allow operation at higher rotary speeds.

It is well known that in particular at higher rotational speeds, the current induced in the rotor itself induces a reaction field, commonly called armature reaction. The actual magnetic field "seen" by the conductors of the rotor is consequently given by the superposition of the static magnetic field provided by the static outer core and this armature reaction. The superposition does not have the desired rectangular characteristic anymore but rather a distorted one, giving rise to unbalanced currents in the conductors of the rotor and correspondingly to ripples and peaks in the induced voltage pattern. These ripples and peaks can be critical in the sense that they lead to peak loads on the diodes used for rectifying the alternating current induced in the conductors of the rotor, which peak loads lead to an overload on the diodes and finally to a breaking of the diodes and to corresponding short-circuits.

SUMMARY OF THE INVENTION

It is therefore the aim of the present invention to propose a process for cancelling the reaction field induced by a rotor, which rotor is rotating in a static magnetic field in a static outer core, and which rotor comprises at least two, but preferably a multiplicity of conductors aligned substantially parallel to the axis of the rotor.

An exemplary process embodying principles of the present invention includes a set of auxiliary windings is located on the static outer core, and that the auxiliary windings are fed with a direct current cancelling the reaction field.

It is thus possible to cancel the armature reaction, which is also static, by means of simple auxiliary windings provided on the static outer core and by feeding these windings with a direct current such that the reaction field is cancelled. Almost full restoration of the ideal homogeneous field, as induced by a static field winding (or by permanent magnet), which is present when the rotor is not rotating is possible when using the proposed topology. The design of the windings can e.g. be realised by using simple bar technology allowing a cheap and easy manufacturing of this cancellation means for the armature reaction.

According to a first preferred and particularly simple and elegant embodiment of the invention, the geometry of the auxiliary windings is the same as the one of the rotor. It has to be noted that the armature reaction induced by the rotor is basically given by the geometry of the conductors in the rotor and by the current flowing in these conductors. It is thus surprisingly easily possible, by adapting the geometry of the auxiliary winding to the geometry of the conductors of the rotor, to produce, by means of these auxiliary windings, a field of the same geometry as the armature reaction but with opposite sign which consequently efficiently cancels the armature reaction. To this end, preferentially the individual conductors of the windings are substantially equally fed with a direct current of opposite direction to the one induced in the conductors of the rotor when it is rotating. This is particularly useful if the rotor is a rotor of an exciter comprising means for rectifying the alternating current induced in the conductors of the rotor, as in this case the armature reaction can have particularly detrimental effects on the diodes.

According to another preferred embodiment of the present invention, the auxiliary windings are substantially located on the inner surface of the static outer core and in the region of the rotor the auxiliary windings are arranged substantially parallel to the axis of the rotor. Locating the auxiliary windings as close as possible to the air gap makes sure that the field to cancel the armature reaction indeed has substantially the same geometry as the field generated by the conductors of the rotor. The larger the radial distance between the conductors of the rotor and the conductors of the auxiliary windings, the larger the geometrical differences between the two fields and the less perfect the cancellation of the armature reaction.

According to still another preferred embodiment of the invention, the same number of individual conductors of the auxiliary windings are provided as there are conductors on the rotor, wherein these individual conductors of the auxiliary windings are evenly distributed circumferentially around the air gap. In particular if the rotor is also having a design with conductors evenly distributed circumferentially about its circumference, such an auxiliary winding almost perfectly reproduces the geometry of the armature reaction and is thus capable of cancelling it very efficiently.

Control of the current fed through the conductors of the auxiliary windings can be effected by a control unit which uses parameters like the speed of rotation, the induced direct current/voltage in the rotor, and/or the direct current used to induce the static field on the static outer core to regulate the current to cancel the armature reaction. However, in particular during transients, that is in situations where the static field is increased or decreased (e.g. for controlling the direct current fed to the rotor of the generator), the current flowing in the conductors of the rotor cannot be derived from the current fed through the winding to induce the static field or from the direct current generated by the rotor. According to another preferred embodiment of the present invention, it is therefore proposed to provide at least one sensor to measure the armature reaction and to control the current fed through the auxiliary windings in response to the signal generated by this sensor. This control allows to reduce peak loads on the diodes thus reducing the risk of breaking of the diodes.

According to still another preferred embodiment, the sensor is only sensitive to components of a magnetic field in one spatial direction but not to components perpendicular to that direction. This can for example be realised by using a Hall sensor. Preferentially, the sensor is located at a position, where the static magnetic field induced by a field winding or by a permanent magnet is substantially perpendicular to the sensitive direction of the sensor. The current fed through the auxiliary windings is controlled such that the signal generated by the sensor substantially corresponds to a zero reaction field at the position of the sensor. To this end the sensor may be located next to the field winding in or close to the air gap between the rotor and the static outer core.

Additionally, the present invention relates to a static outer core for a rotor, preferably for a squirrel cage type rotor, characterised in that a set of auxiliary windings is provided on the static outer core, wherein said auxiliary windings can be fed with a direct current (DC) for cancelling the reaction field of the rotor induced when it is rotating in the static field in the static outer core. Preferentially, the geometry of these auxiliary windings is the same as the one of the conductors of the rotor, and the individual conductors of the windings are preferentially substantially equally fed with a direct current of opposite direction to the one induced in the conductors of the rotor when it is rotating.

According to a preferred embodiment of the static outer core according to the present invention, the static field is induced by at least one field winding fed with a direct current of in the range of 1 to 100 Ampere, preferably in the range of 5 to 15 Ampere, or the bipolar or multipolar static field is induced by a permanent magnet, wherein the control of the static field is then achieved by a field winding.

Furthermore, the present invention relates to a brushless exciter for use with a synchronous generator for energising the field winding of its rotor, which is characterised in that it comprises a static outer core as it is described above. The cancellation of the armature reaction according to the invention proves to be particularly effective in case of use of a rotor for an exciter comprising at least two conducting bars aligned substantially parallel to the axis of the rotor, wherein said bars are connected on their first axial end to a collecting ring and wherein on their second axial end the bars are connected individually to two rings by means of diodes with reversed polarity such that alternating current induced in the conducting bars due to a static field is converted into a direct current (DC) in the two rings. Preferentially, the bars are arranged close to the radial surface of the rotor, preferably as close as possible to the air gap between the rotor and the static outer core. In particular in case of so-called squirrel cage rotors with at least 4 conducting bars, preferably at least 8 conducting bars, and even more preferably 16 conducting bars, all of which conducting bars are evenly distributed along the circumferential radial angle of the rotor, the cancellation can be effectively applied due to the fact that the geometry of the armature reaction can be substantially reproduced and cancelled by such auxiliary windings. This is particularly necessary in case of speeds of operation of 6000 to 8000 rotations per minute thereby inducing a direct current in the two rings of the rotor of more than 2000 Ampere, preferably inducing a direct current of more than 10000 Ampere.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
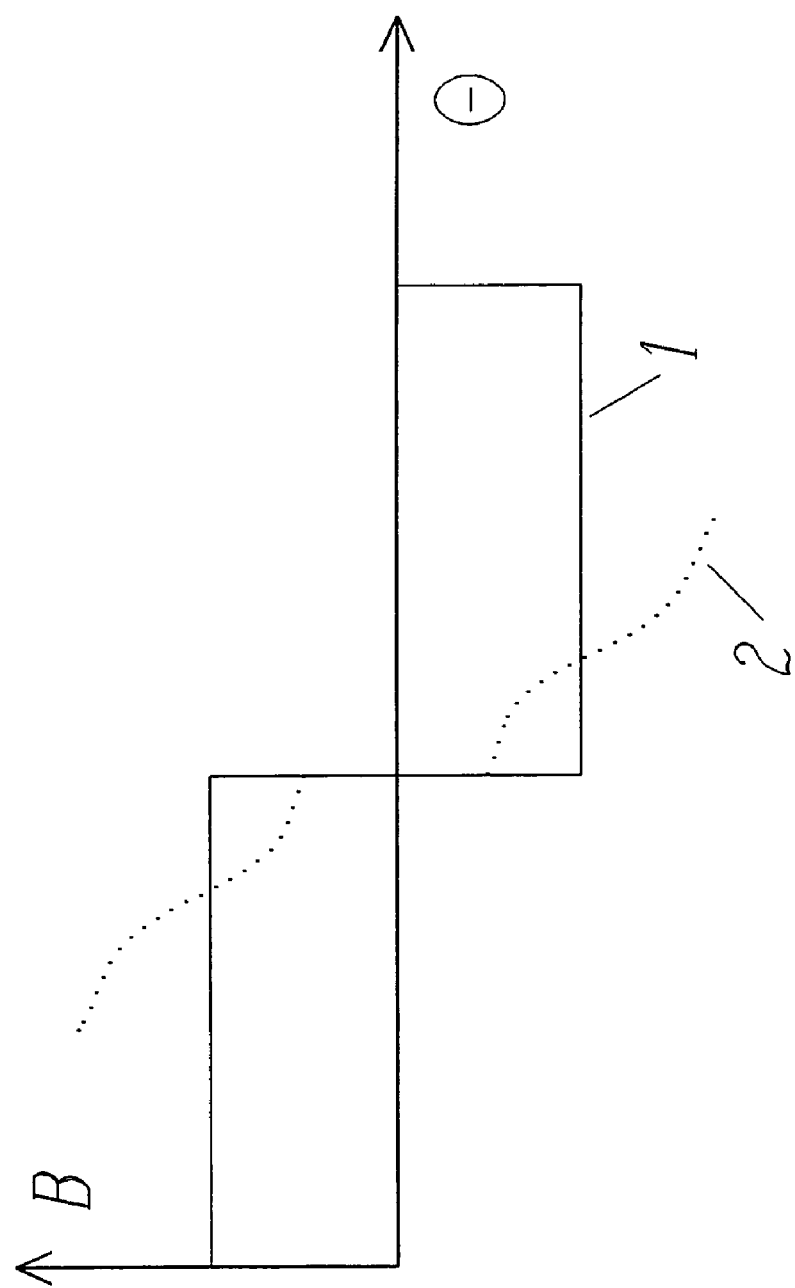
FIG. 1 shows a schematic representation of the static magnetic field (B) as a function of the circumferential angle Theta.
Figure 2:
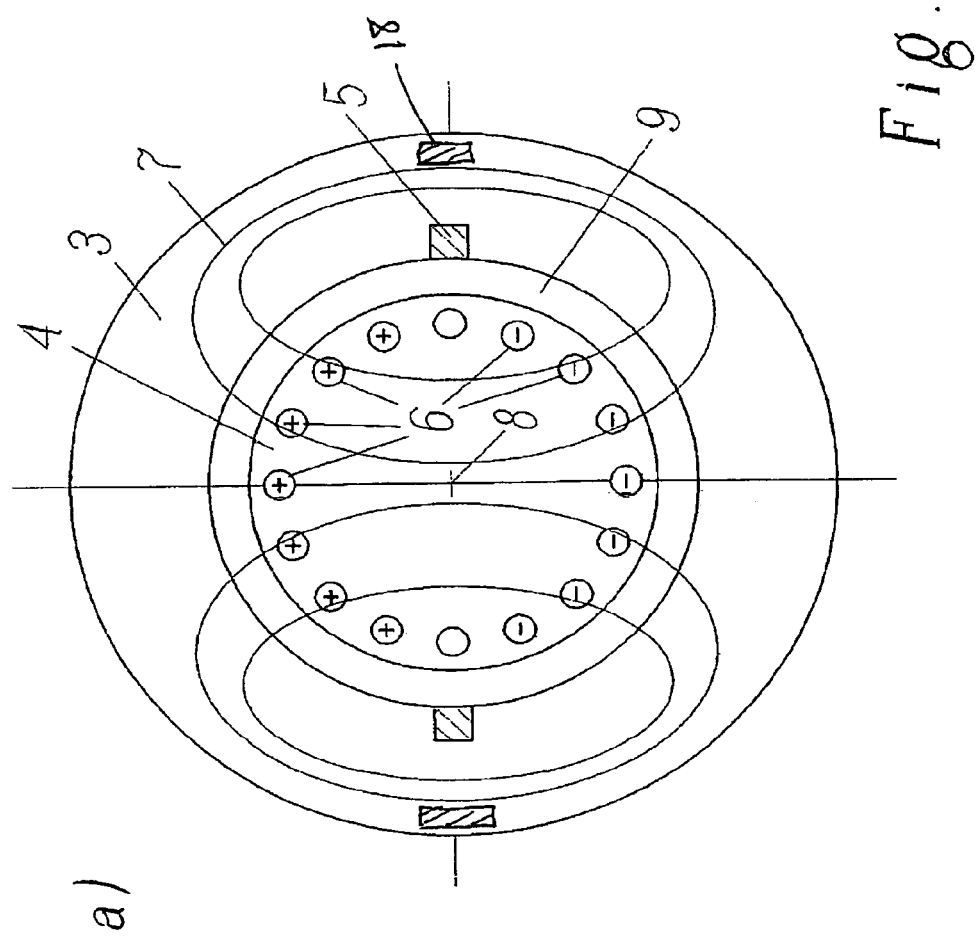
FIG. 2a) shows a schematic cut perpendicular to the axis of the exciter through the rotor according to the invention; b) schematically shows the electrical connectivity of the rotor.

FIG. 2a) shows an axial cut through an exciter serving as a preferred embodiment. The rotor 4 is coaxially mounted in an static outer magnetic core 3, wherein in between there is an air gap 9. The static outer core 3 comprises a field winding 5 which induces a magnetic field as indicated with the lines 7. In this embodiment the induced magnetic field 7 is bipolar, i.e. the field winding 5 is fed with a current positive on the right side and negative on the left side or vice versa in FIG. 2a). It is however also possible to have a permanent magnet 18 giving rise to such a bipolar field. The use of a permanent magnet 18 does not allow to directly control the current induced in the rotor, which is necessary to control the output power of the generator, and therefore usually if permanent magnets 18 are used, there is also a field winding 5, which can be used either to increase or to decrease the static background magnetic field by feeding it with an appropriate current. The magnetic field 1 induced by the field winding 5 is schematically drawn in FIG. 1 as a function of the angle theta around the rotational axis 8 common to the rotor 4 and the static outer core 3. The ideal magnetic field 1 shows a rectangular characteristic, the sign change being located at the position where theta aims at the field winding 5, i.e. horizontally in FIG. 2*a*).

The static outer core 3 comprises a field winding 5 which induces a magnetic field as indicated with the lines 7. In this embodiment the induced magnetic field 7 is bipolar, i.e. the field winding 5 is fed with a current positive on the right side and negative on the left side or vice versa in FIG. 2*a*). It is however also possible to have a permanent magnet giving rise to such a bipolar field. The use of a permanent magnet does not allow to directly control the current induced in the rotor, which is necessary to control the output power of the generator, and therefore usually if permanent magnets are used, there is also a field winding 5, which can be used either to increase or to decrease the static background magnetic field by feeding it with an appropriate current. The magnetic field 1 induced by the field winding 5 is schematically drawn in FIG. 1 as a function of the angle theta around the rotational axis 8 common to the rotor 4 and the static outer core 3. The ideal magnetic field 1 shows a rectangular characteristic, the sign change being located at the position where theta aims at the field winding 5, i.e. horizontally in FIG. 2*a*).

As can be seen from FIG. 2*a*), basically the rotating part, i.e. the rotor 4, looks very much like the one of an induction machine with a squirrel cage rotor. On a one side all the conductors which in this case are given by bars 6 are welded or electrically connected to a ring 13 (see FIG. 2*b*)) which collects the current and dispatches it to the return bars 6. On the other side, each bar 6 is electrically connected individually to two rings 14 and 15 by means of diodes 16 with reversed polarity. These two rings are the DC terminals. All the bars 6 are identical and are evenly distributed around the circumference of the rotor 4. The crossed diodes 16 lead to a rectification of the alternating current induced in the bars 6 when the rotor is rotating in the static magnetic field 7, thus giving rise to a direct current (DC) in the two rings 14 and 15, which current 17 can subsequently be used for energising the rotor of the generator.

The bars 6 as well as the rings 13, 14, 15 are made of copper or aluminium. For a diameter of the rotor 4 of 600 mm, 50 bars are distributed along the circumference of the rotor 4, each of the bars 6 having a substantially circular cross-section with a diameter of 10 to 15 mm. Such a rotor is capable of rotating at speeds of 4000 to 8000 rotations per minute, and of producing direct currents in a range of 5000 to 20000 Ampere. The achievable rotational speeds are therefore at least twice as high as conventional speeds, and the achievable currents are even in the range of 20 to 30 times with respect to the state-of-the-art. The rings 13, 14, 15 are circumferential to withstand the centrifugal forces at these rotations. The bars 6 may be moulded into corresponding slots of the rotor 4, which slots preferably have shapes which allow a tight fixing of the bars with respect to centrifugal loads (e.g. dove tails). Another possibility is to provide axial holes in the rotor 4 and to insert bars 6 into these holes from the axial side.

With this arrangement one has a huge number of diodes in parallel. If one diode is overloaded it will break, resulting in a permanent short and therefore in a fatal fault. It is thus important that the current is perfectly balanced between all of the parallel paths.

The internal voltage V across a given diode is the sum of the threshold voltage, $V_0$, plus a term which is proportional to the current:

$$V = V_0 + r_i I$$

The internal resistance is quite weak and any unbalance in the electromotive force would result in a large discrepancy in current through the parallel diodes.

In order to obtain substantially exactly the same electromotive force on each parallel bar of the squirrel cage, the air gap field should be as "rectangular" as possible, as given by curve 1 in FIG. 1, and as it is induced by the field winding 5 according to FIG. 2*a*).

When no current flows in the squirrel cage the field 7 well matches the required rectangular shape 1. The situation degrades as soon as a current flows in the "squirrel cage", i.e. in the bars 6, as indicated in FIG. 2*a*) by the plus and minus signs. When the DC current flowing in the bars 6 is low it will be distributed more or less according to the generated voltage.

Figure 3:
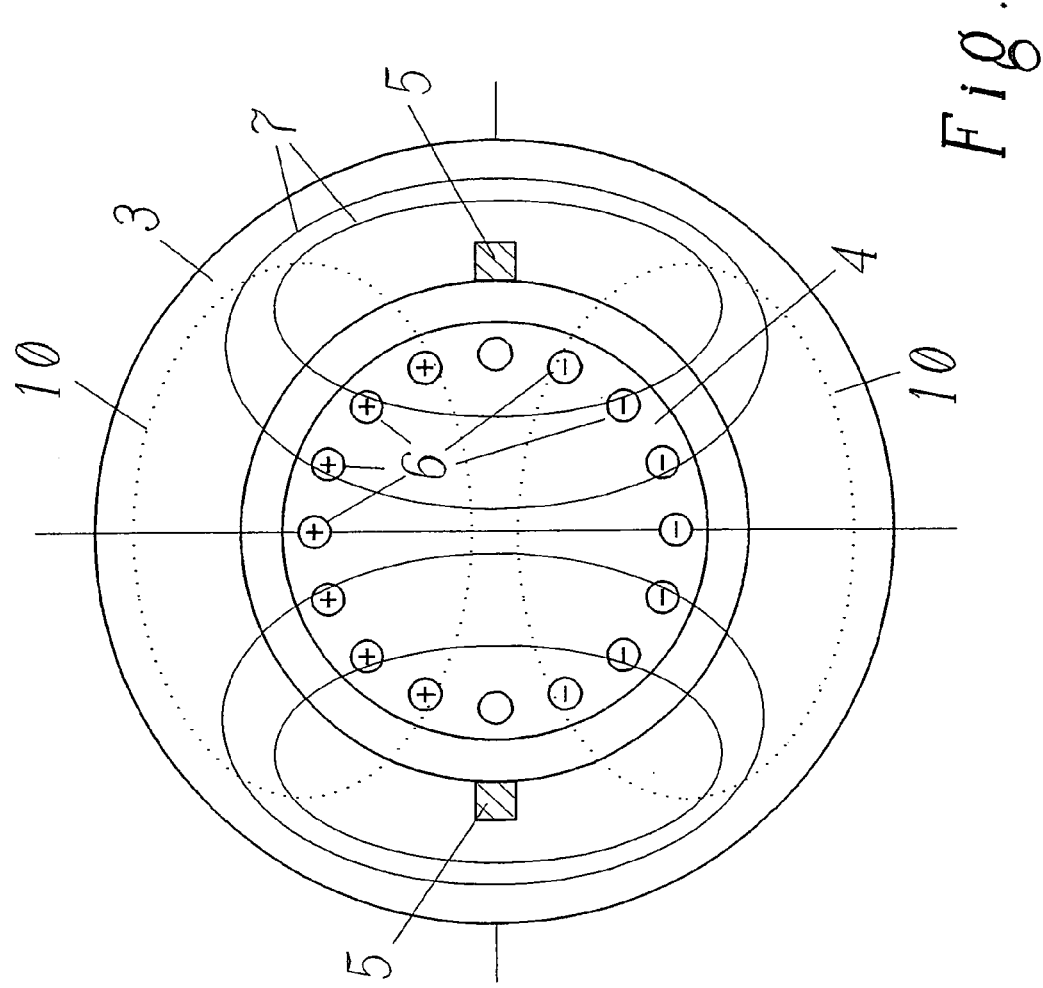
FIG. 3 shows a cut according to FIG. 2a), where the armature reaction during rotation of the rotor is indicated.

The resulting flux pattern is given in FIG. 3. It creates an armature reaction 10 with, as usual in synchronous machines, a 90 degree shift. This field is static, constant in size and direction, and will add-up to the main field 7 produced by the single turn field winding 5. The angular distribution of field 10 is more or less a sine wave, whereas the induction field 7 is rectangular and 90 degree out of angular phase. When the current in the bars 6 increases, the armature reaction 10 will increase, thus distorting the magnetic field. This qualitatively leads to a field characteristic as given by the dotted curve 2 in FIG. 1.

The generated voltage out of this distorted field 2 will no longer be of the required rectangular shape. This results in a distorted voltage pattern, giving rise to an additional (building-up with the former) field distortion. By the end of the process the voltage distortion will result in an unacceptably high value of the repetitive peak current in the diodes, still with a withstandable mean value. Sooner or later one diode will fail, followed by a cascade of failures of the other diodes. It may therefore be advantageous to provide means to cancel the armature reaction 10 in case of such a rotor 4. As given in FIG. 4, the idea is simply to add an auxiliary winding 11 on the static part 3, to compensate for the armature reaction 10. This field winding 11 should simply have the same geometry as the bars 6 of the rotor, i.e. the squirrel cage. Because an even distribution of current on the rotating part is desired, one has to cancel the armature reaction 10 with an even angular distribution of currents. The auxiliary winding 11 should simply be fed by a DC current of same amplitude in each slot. The simplest is to have all the auxiliary turns 11 in parallel, in such a way that the conductors 11 located on a one side of the main turn hold current in one direction and the conductors on the opposite side hold current in the opposite direction, a situation which is indicated in FIG. 4 by plus and minus signs, which are opposite to the signs in the rotor 4.

In particular during the time of transients, the current out of the exciter 17 does not follow exactly the generated voltage. Transients are for example given when the inducing field 7 is increased or decreased by changing the DC fed through the static winding 5 in order to change the direct current 17 to be fed to the rotor of the generator, thereby changing the power output of the generator. Additionally, due to saturation effects and turn localisation, the actual current which has to be fed to the auxiliary winding 11 cannot be assessed neither from the main coil current through the winding 5 nor from the output current 17. As the armature reaction 10 may depend on the actual duty of the exciter, and to enable tuning, the auxiliary winding current 11 may preferably be determined from a simple field measurement in the air gap 9, for instance at the mean angular position of the main winding 5, where the armature reaction is strongest and where the main field is theoretically zero, in particular in a direction orthogonal to the plane defined by the main winding 5.

Figure 4:
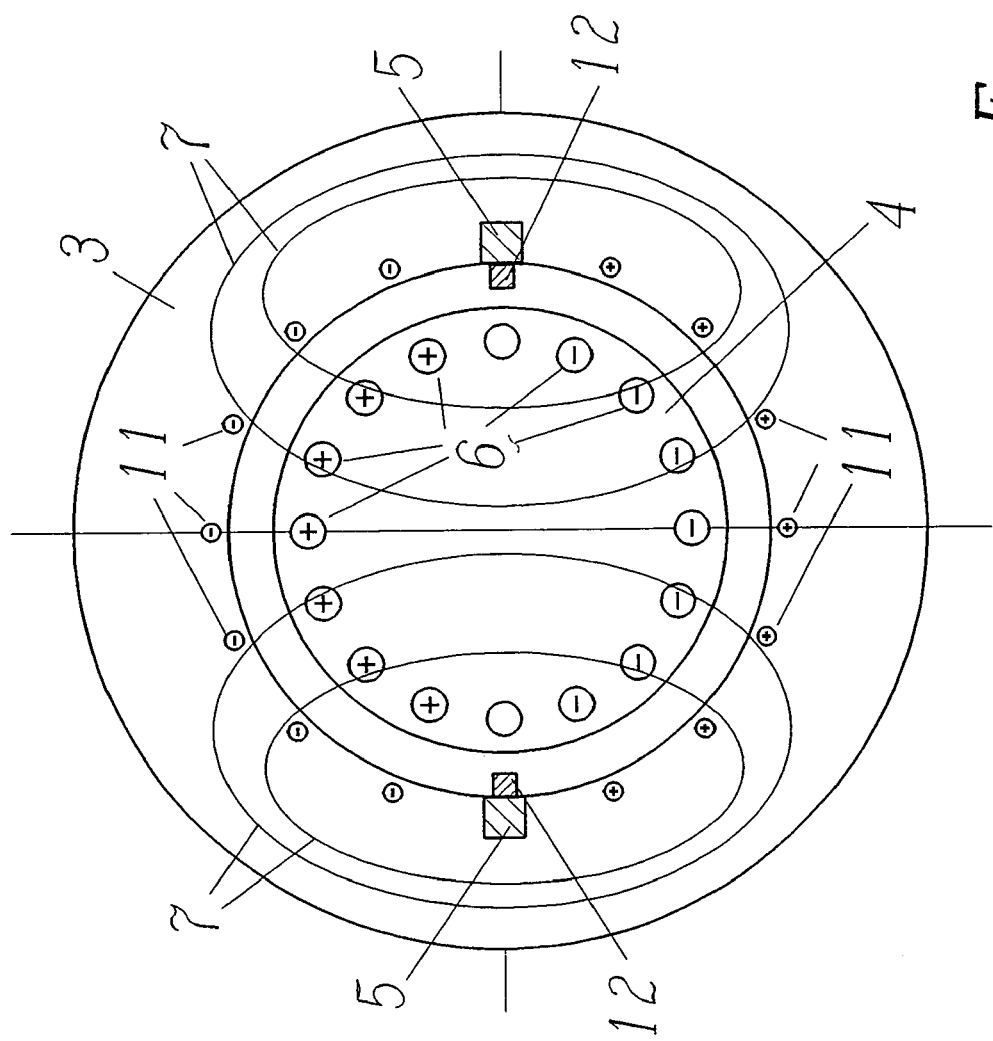
FIG. 4 shows a cut according to FIG. 2a), wherein additionally means for compensation of the armature reaction are located on the static outer core.

The field measurement can be carried out by a sensor 12, as indicated in FIG. 4. The sensor may e.g. be a Hall sensor, whereby the axis with respect to which the sensor is actually capable of measuring the magnetic field is oriented perpendicularly to the axis defined by the plane given by the static winding 5 and therefore perpendicularly to the main direction of the desired static main field 7 (i.e. horizontally in FIG. 4). For maximum sensitivity of the sensor 12 its sensitive axis should be oriented parallel to the main component of the armature reaction 10.

The same configuration and balancing means can be applied in 4-pole or even higher pole number. The main benefits are:

Voltage/current ratio can be changed by connecting poles in series.

Reduced magnetic core cross section.

Smaller cross section and length of the end-windings of the main winding, the auxiliary winding, and of the squirrel cage.

Better balance of magnetic forces.

However, there are some penalties when using more than one pair of pole like e.g.:

Increased diode commutation frequency.

Connection rings of the "squirrel cage" have to be split. The mechanical management to withstand the centrifugal force becomes more sophisticated, therefore more expensive.

As mentioned above, for the generation of the static field 7 also a permanent magnet can be used. The use of permanent magnet is quite easy, because it is on the static part 3 and the required field is "rectangular". The advantage of using permanent magnets to provide the background field (which is, if need be attenuated or increased by a supplementary field winding, used to generate the offset on the background field provided by the permanent magnet) is, first, to lower the armature reaction 10, thus making its cancellation easier. The specific geometry of this exciter in this case allows to keep the main coil 5 and use it only to make an offset field. For instance the permanent magnet can provide the required field to produce the rated current of the rotor of the generator. The main coil 5 of the exciter will then be used only to increase or decrease the magnetic field by the quite small amount required to control the generator voltage. The load on the main coil will be high only during no-load and over-excited operation.

To summarise, one can foresee the following advantages of the new exciter topology:

Compactness: due to simple end-windings.

Robust winding: allows very high peripheral speed, thus increasing the B field usage (V=B.l.v: increasing speed allows to have shorter length or weaker magnetic field).

Low cost manufacturing: similar to an induction machine, bar technology.

Very short commutation time due to the low inductance of loops.

Making the end of shaft free for any other purpose.

Allowing to use any grade of diodes, individual diodes have no need to be rated for high current or for high voltage, or to be fast ones.

The exciter can be completely integrated to the shaft. This is of particular interest for double turbine arrangements where on both sides of the generator there is a turbine, or when critical speed problems become significant.

LIST OF REFERENCE NUMERALS

1 ideal air gap field
2 approximate air gap field with armature reaction
3 static outer magnetic core
4 rotor
5 field winding
6 bars of the squirrel cage rotor
7 field induced by the field winding
8 axis of the rotor
9 air gap
10 armature reaction
11 auxiliary winding
12 sensor
13 collecting ring
14 first direct current (DC) ring
15 second direct current (DC) ring
16 diodes
17 direct current to rotor of the generator

The invention claimed is:

1. A process for cancelling the reaction field induced by a rotor, which rotor is rotating in a static magnetic field in a static outer core, and which rotor includes at least two conductors aligned substantially parallel to the axis of the rotor, the process comprising:

feeding a set of auxiliary windings, located on the static outer core, with a direct current (DC) cancelling the reaction field, wherein the geometry of the conductors of the auxiliary windings is the same as the geometry of at least two conductors of the rotor, and wherein feeding comprises substantially equally feeding individual conductors of the auxiliary windings with a direct current (DC) of opposite direction to current induced in the at least two conductors of the rotor when the rotor is rotating.

2. A process according to claim 1, wherein the auxiliary windings are substantially located on the inner surface of the static outer core, and in the region of the rotor the auxiliary windings are arranged substantially parallel to the axis of the rotor.

3. A process according to claim 1, wherein the number of individual conductors of the auxiliary windings is the same as the number of conductors on the rotor, and wherein said individual conductors of the auxiliary windings are evenly distributed circumferentially around an air gap.

4. A process according to claim 1, further comprising:

measuring the armature reaction with at least one sensor and generating a signal with the sensor; and controlling the current fed through the auxiliary windings in response to the signal generated by the sensor.

5. A process according to claim 4, wherein the sensor is only sensitive to components of a magnetic field in one spatial direction and not sensitive to components perpendicular to said one spatial direction;

wherein the sensor is located at a position where the static magnetic field induced by a field winding or by a permanent magnet is substantially perpendicular to said one spatial direction of the sensor; and further comprising:

controlling the current fed through the auxiliary windings so that the signal generated by the sensor substantially corresponds to a zero reaction field at the position of the sensor.

6. A process according to claim 4, wherein the sensor is located next to the field winding in or close to an air gap between the rotor and the static outer core.

7. A static outer core for a rotor, the rotor having conductors, the core comprising:
- a static outer core, and
- a set of auxiliary windings on said static outer core, the auxiliary windings comprising conductors;
- wherein said set of auxiliary windings are configured and arranged to be fed with a direct current (DC) for cancelling the reaction field of the rotor induced when the rotor is rotating in the static outer core;
- wherein the geometry of the conductors of the auxiliary windings is the same as the geometry of the conductors of the rotor; and
- wherein the individual conductors of the auxiliary windings are configured and arranged to be substantially equally fed with a direct current (DC) of opposite direction to the current induced in the conductors of the rotor when the rotor is rotating.

8. A static outer core according to claim 7, wherein the number of individual conductors of the auxiliary windings is the same as the number of conductors on the rotor, and wherein said individual conductors of the auxiliary windings are evenly distributed circumferentially around an air gap.

9. A static outer core according to claim 7, further comprising:
- at least one sensor configured and arranged to measure the reaction field and to generate a signal; and
- means for controlling the current fed through the auxiliary windings in response to the signal generated by the sensor.

10. A static outer core according to claim 9, further comprising:
- a field winding; and
- wherein the sensor is located next to the field winding in or close to an air gap between the rotor and the static outer core.

11. A static outer core according to claim 7, further comprising:
- at least one field winding, the static field being induced by the at least one field winding when fed with a direct current in the range of 1 to 100 Ampere; or
- a permanent magnet and a field winding, the bipolar static field being induced by the permanent magnet and the field winding controlling the bipolar static field.

12. A brushless exciter for use with a synchronous generator for energising the field winding of a rotor of the generator, comprising:
- a static outer core according to claim 7.

13. A brushless exciter according to claim 12, further comprising:
- a collecting ring, two rings, and diodes with reversed polarity; and
- a rotor having at least two conducting bars aligned substantially parallel to the axis of the rotor, the bars being connected on a first axial end to the collecting ring and each bar connected on a second axial end individually to the two rings by the diodes, such that alternating current induced in the conducting bars due to a static field is converted into a direct current in the two rings.

14. A brushless exciter according to claim 13, wherein the collecting ring is circumferential.

15. A brushless exciter according to claim 13, wherein the bars are arranged close to a radial surface of the rotor.

16. A brushless exciter according to claim 13, wherein said at least two conducting bars comprises at least four conducting bars evenly distributed along the circumference of the rotor.

17. A brushless exciter according to claim 13, wherein the exciter is configured and arranged to be operated at speeds of 6000 to 8000 rotations per minute thereby inducing a direct current in the two rings of more than 2000 Ampere.

18. A process according to claim 1, wherein the rotor comprises a rotor of an exciter, the exciter comprising means for rectifying the alternating current induced in the conductors of the rotor.

19. A static outer core for a rotor in accordance with claim 7, wherein said static outer core comprises a static outer core for a squirrel cage type rotor.

20. A static outer core for a rotor in accordance with claim 7, wherein the rotor comprises a rotor of an exciter, wherein the exciter comprises means for rectifying the alternating current induced in the conductors of the rotor.

21. A static outer core for a rotor in accordance with claim 7, wherein the auxiliary windings are substantially located on the inner surface of the static outer core, and wherein in the region of the rotor the auxiliary windings are arranged substantially parallel to the axis of the rotor.

22. A static outer core for a rotor in accordance with claim 9, wherein the sensor is only sensitive to components of a magnetic field in one spatial direction and not to components perpendicular to said one spatial direction.

23. A static outer core for a rotor in accordance with claim 22, wherein the sensor is located at a position where the static magnetic field induced by a field winding is substantially perpendicular to said one spatial direction.

24. A static outer core for a rotor in accordance with claim 11, wherein the static field is induced by the at least one field winding when fed with a direct current in the range of 5 to 15 Ampere.

25. A brushless exciter according to claim 14, wherein the two rings are circumferential.

26. A brushless exciter according to claim 15, wherein the bars are arranged close to the air gap between the rotor and the static outer core.

27. A brushless exciter according to claim 16, wherein said at least four conducting bars comprises at least eight conducting bars.

28. A brushless exciter according to claim 27, wherein said at least eight conducting bars comprises at least sixteen conducting bars.

29. A brushless exciter according to claim 17, wherein the exciter is configured and arranged to induce a direct current of more than 10000 Ampere.

* * * * *